(12) United States Patent
Yang

(10) Patent No.: US 8,496,080 B2
(45) Date of Patent: Jul. 30, 2013

(54) WHEEL DRIVEN MECHANISM

(75) Inventor: Yee-Pien Yang, Taipei (TW)

(73) Assignee: National Taiwan University, Taipei (TW)

(*) Notice: Subject to any disclaimer, the term of this patent is extended or adjusted under 35 U.S.C. 154(b) by 300 days.

(21) Appl. No.: 12/895,148

(22) Filed: Sep. 30, 2010

(65) Prior Publication Data

US 2012/0080933 A1 Apr. 5, 2012

(51) Int. Cl.
*B60K 7/00* (2006.01)

(52) U.S. Cl.
USPC ........................................... 180/65.51

(58) Field of Classification Search
USPC ................................................ 180/65.51
See application file for complete search history.

(56) References Cited

U.S. PATENT DOCUMENTS

| | | | |
|---|---|---|---|
| 4,125,169 A | 11/1978 | Harris | |
| 4,179,633 A | 12/1979 | Kelly | |
| 4,274,503 A | 6/1981 | Mackintosh | |
| 4,315,171 A * | 2/1982 | Schaeffer | 310/49.53 |
| 4,324,414 A | 4/1982 | Wilkes | |
| 4,483,653 A | 11/1984 | Waite | |
| 4,542,917 A | 9/1985 | Waite | |
| 4,598,921 A | 7/1986 | Fenwick | |
| 4,735,431 A | 4/1988 | Tait | |
| 4,754,207 A * | 6/1988 | Heidelberg et al. | 318/400.41 |
| 4,759,418 A | 7/1988 | Goldenfeld | |
| 4,941,540 A | 7/1990 | Bernstein | |
| 5,113,959 A | 5/1992 | Mastov | |
| 5,164,623 A * | 11/1992 | Shkondin | 310/67 R |
| 5,222,567 A | 6/1993 | Broadhead | |
| 5,234,066 A | 8/1993 | Ahsing | |
| 5,341,680 A | 8/1994 | Smart | |
| 5,350,032 A | 9/1994 | Smith | |
| 5,555,495 A | 9/1996 | Bell | |
| 5,732,786 A * | 3/1998 | Fujigaki | 180/19.3 |
| 5,796,192 A | 8/1998 | Riepl | |
| 5,812,978 A | 9/1998 | Nolan | |
| 5,818,189 A * | 10/1998 | Uchiyama et al. | 318/488 |
| 5,834,874 A * | 11/1998 | Krueger et al. | 310/191 |
| 5,920,136 A | 7/1999 | Schmid | |
| 5,927,739 A | 7/1999 | Evling | |
| 6,002,192 A | 12/1999 | Krivospitski | |
| 6,050,356 A | 4/2000 | Takeda | |
| 6,057,617 A | 5/2000 | Schmid | |
| 6,059,060 A | 5/2000 | Kanno | |
| 6,092,615 A | 7/2000 | Pusch | |
| 6,112,837 A | 9/2000 | Kanno | |
| 6,145,612 A | 11/2000 | Dickie | |

(Continued)

FOREIGN PATENT DOCUMENTS

TW I 278308 4/2007

*Primary Examiner* — J. Allen Shriver, II
*Assistant Examiner* — Erez Gurari
(74) *Attorney, Agent, or Firm* — Muncy, Geissler, Olds & Lowe, PLLC

(57) ABSTRACT

This invention relates to a wheel driven mechanism for a vehicle such as a wheelchair, an electrical bicycle, or a motorcycle, especially to a vehicle which has a wheel driven by power but without using an independent electric motor. The wheel driven mechanism comprises a rotor, a plurality of permanent magnets, a stator, and a plurality of electromagnets. The rotor is divided into a first block and a second block, and the permanent magnets are disposed within the first block to reduce the weight and the cost of the wheel driven mechanism. Furthermore, the user can easily rotate the handwheel mechanism during power off.

5 Claims, 9 Drawing Sheets

U.S. PATENT DOCUMENTS

| | | |
|---|---|---|
| 6,213,487 B1 | 4/2001 | Doroftei |
| 6,234,504 B1 | 5/2001 | Taylor |
| 6,247,715 B1 | 6/2001 | Korosue |
| 6,276,705 B1 | 8/2001 | Baldwin |
| 6,286,616 B1 | 9/2001 | Kutter |
| 6,302,226 B1 * | 10/2001 | Kanno et al. ............... 180/6.5 |
| 6,354,390 B1 | 3/2002 | Uchiyama |
| 6,459,962 B2 | 10/2002 | Ulrich |
| 6,481,514 B2 | 11/2002 | Takada |
| 6,492,756 B1 | 12/2002 | Maslov |
| 6,494,278 B1 | 12/2002 | Weisz |
| 6,571,892 B2 | 6/2003 | Kamen |
| 6,715,780 B2 | 4/2004 | Schaeffer |
| 6,746,034 B2 | 6/2004 | Fowles |
| 6,807,465 B2 | 10/2004 | Ulrich |
| 6,836,035 B1 * | 12/2004 | Pawletko ................ 310/49.08 |
| 6,863,141 B2 | 3/2005 | Weisz |
| 6,880,653 B2 | 4/2005 | Kanno |
| 6,906,446 B2 * | 6/2005 | Post ........................ 310/191 |
| 6,910,543 B2 | 6/2005 | Kanno |
| 6,949,864 B2 * | 9/2005 | Maslov et al. ............ 310/254.1 |
| 6,975,054 B2 * | 12/2005 | Shkondin ................... 310/148 |
| 7,119,468 B2 * | 10/2006 | Shkondin ................... 310/114 |
| 7,204,328 B2 | 4/2007 | LoPresti |
| 7,242,122 B2 | 7/2007 | Konfrst |
| 7,285,889 B2 * | 10/2007 | Shkondin ................... 310/148 |
| 7,528,518 B2 | 5/2009 | Maeda |
| 7,528,521 B2 | 5/2009 | Naitou |
| 7,579,738 B2 | 8/2009 | Cros |
| 7,592,733 B2 | 9/2009 | Naitou |
| 7,642,686 B2 | 1/2010 | Naitou |
| 7,651,103 B1 | 1/2010 | Peridon |
| 7,686,145 B2 | 3/2010 | Akagi |
| 2001/0054849 A1 | 12/2001 | Rybak |
| 2003/0057791 A1 * | 3/2003 | Post ........................ 310/191 |
| 2003/0098190 A1 | 5/2003 | Kanno |
| 2003/0217878 A1 | 11/2003 | Etzioni |
| 2005/0045392 A1 | 3/2005 | Maslov |
| 2005/0236217 A1 | 10/2005 | Koelin |
| 2007/0018528 A1 | 1/2007 | Naitou |
| 2007/0018529 A1 | 1/2007 | Naitou |
| 2007/0020985 A1 | 1/2007 | Naitou |
| 2007/0062774 A1 | 3/2007 | Akagi |
| 2007/0208483 A1 | 9/2007 | Rabin |
| 2007/0241628 A1 * | 10/2007 | Himmelmann et al. ....... 310/190 |
| 2007/0270722 A1 | 11/2007 | Loeb |
| 2008/0115987 A1 | 5/2008 | Barthelt |
| 2009/0289512 A1 | 11/2009 | Prucher |
| 2010/0036543 A1 * | 2/2010 | Bitzer et al. ................... 701/1 |
| 2010/0230194 A1 * | 9/2010 | James ...................... 180/65.51 |
| 2011/0200473 A1 * | 8/2011 | Pekrul ........................ 418/1 |
| 2012/0080933 A1 * | 4/2012 | Yang ........................ 301/6.5 |

* cited by examiner

WHEEL DRIVEN MECHANISM

BACKGROUND OF THE INVENTION

1. Field of the Invention

This invention relates to a powered wheel for a vehicle such as a wheelchair, an electrical bicycle, or a motorcycle, especially to a vehicle which has a wheel driven by power but without using an independent electric motor.

2. Description of Related Art

FIG. 1 illustrates a previous invention of handwheel mechanism for a wheelchair powered by electricity, a Taiwan Patent No. I278308 published on Patent Official Gazette on Apr. 11, 2007. The Taiwan patent prior art I278308 is made by the same inventor of this application. The handwheel mechanism 10 comprises a wheel 11, a plurality of frames 14, a plurality of permanent magnets 13, and a plurality of electromagnets 16. The permanent magnets 13 are disposed along the wheel 11. The frames 14 are fixed on an axle 17 of the wheel 11, and the electromagnets 16 are disposed on the frames 14. The handwheel mechanism 10 is made for a hand to grab for turning. A plurality of permanent magnets 13 in a form of NS pole pairs are evenly distributed along an inner surface of the wheel 11 facing the axle 17. FIG. 1 shows a plurality of NS paired permanent magnets, radially and evenly arranged along the inner surface of the wheel 11. The permanent magnets 13 occupies full circle of the inner surface of the wheel 11 facing the axle 17.

A plurality of electromagnets 16 which are capable to form temporarily NS paired magnets when energized, are configured in an inner side of the wheel 11, and magnetically couple to the permanent magnets 13 for turning the wheel 11 with respect to the axle 17.

FIG. 1 shows that a plurality of electromagnets 16 are radially configured in an inner side with respect to the permanent magnets 13. The electromagnets 16 are divided into two groups. A first group of the electromagnets 121 are fixed on an outer end of a first frame 141. The inner end of the first frame 141 is fixed on the axle 17. A second group of the electromagnets 123 are fixed on an outer end of the second frames 143. The inner end of the second frame 143 is fixed on the axle 17. The first group of the electromagnets 121 are in a position symmetrical to the second group of the electromagnets 123 with respect to the axle 17.

A space d0 is formed in between the permanent magnets 13 and the electromagnets 16 so that the wheel 11 which carrying the permanent magnets 13 is capable of rotating with respect to the electromagnets 16.

SUMMARY OF THE INVENTION

It is, therefore, the main object of the present invention to provide a wheel driven mechanism, wherein the rotor of the wheel driven mechanism has at least one first block and at least one second block. There are a plurality of permanent magnets disposed in the first block, and there are not permanent magnets disposed in the second block to reduce the cost and the weight of the wheel driven mechanism.

It is another object of the present invention to provide a wheel driven mechanism, which has at least one retractable arm to adjust the space between the electromagnets and the permanent magnets on the rotor, so that the vehicle with the wheel driven mechanism can be moved easily during power off.

It is still another object of the present invention to provide a wheel driven mechanism, which has at least one fringe electromagnet having an arc surface at an outer edge to facilitate to rotate the wheel driven mechanism manually during power off.

To achieve these and other objects, the invention provides wheel driven mechanism, comprising: a rotor comprising a first block and a second block; a plurality of permanent magnets disposed in the first block of the rotor, and the second block is empty; a stator; and at least one electromagnet group disposed on the stator and being adjacent to the inner side of the rotor.

The invention provides a wheel driven mechanism, comprising: a rotor; a plurality of permanent magnets disposed on the rotor; a stator comprising at least one retractable arm; and a plurality of electromagnets disposed on the retractable arm and being adjacent to the inner side of the rotor, wherein the retractable arm is adjustable to be an expansion status or a contraction status.

The invention provides a wheel driven mechanism, comprising: a rotor; a plurality of permanent magnets disposed at the rotor; a stator; and a plurality of electromagnets disposed on the stator and being adjacent to the inner side of the rotor, wherein the electromagnets comprise at least one central electromagnet and two fringe electromagnets having an arc surface at outer edges thereof.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 2:
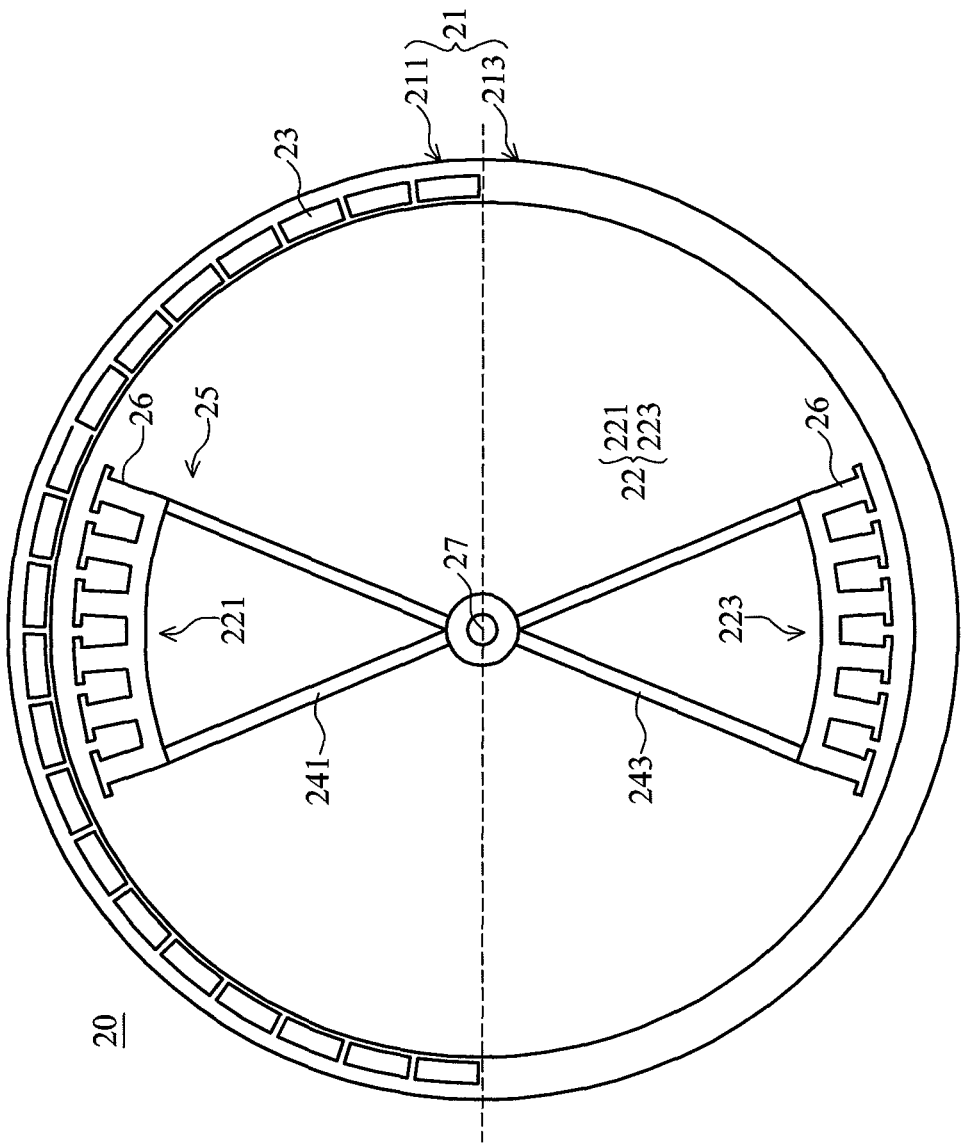
FIG. 2 is the first embodiment of a wheel driven mechanism according to the present invention.

FIG. 2 is the first embodiment of a wheel driven mechanism according to the present invention.

FIG. 2 shows a wheel driven mechanism 20 comprises a rotor 21, a plurality of permanent magnets 23, a stator 25, and a plurality of electromagnets 26. The rotor 21 is divided into two part, such as a first block 211 and a second block 213. The permanent magnets 23 are disposed in the first block 211.

There is not permanent magnets 23 disposed in the second block 213, so that the second block 213 of the rotor 21 can be an empty block.

Figure 1:
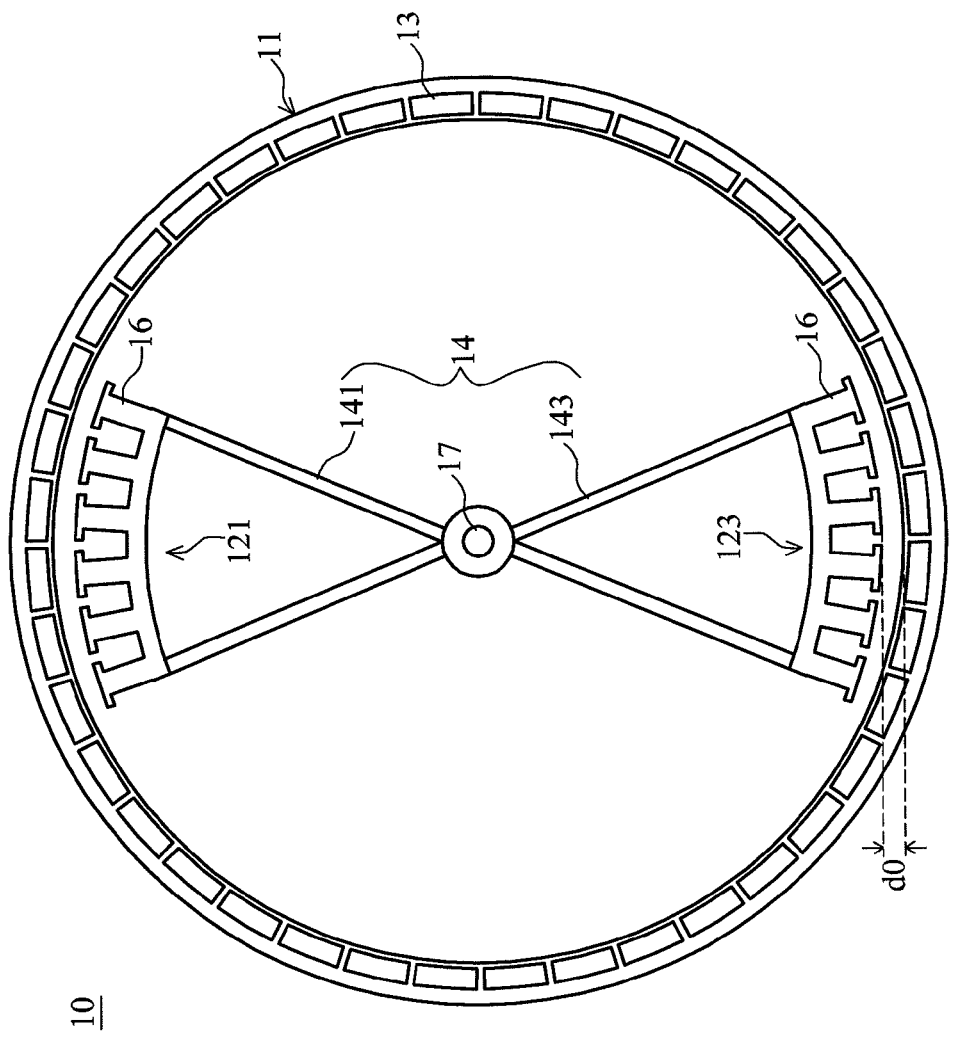
FIG. 1 illustrates a previous invention of handwheel mechanism for a wheelchair powered by electricity.

In one embodiment of the invention, the first block 211 may occupy about half circle along the inner surface of the rotor 21 facing the axle 27, and the permanent magnets 25 are equally spaced and continuingly arranged within the first block 211. Compared to the permanent magnets 13 of FIG. 1, there is only half circle occupation of the permanent magnets 23, in other words, a half number of the permanent magnets 23 of the prior art as shown in FIG. 1 are needed to reduce the weight and cost of the rotor 21. For example, there are twenty permanent magnets 23 in FIG. 2, which is a half number of forty permanent magnets used in the prior art of FIG. 1. Moreover, the user can easily rotate the wheel driven mechanism 20 during power off.

The stator 25 comprises at least one electromagnet group 22, such as a first electromagnet group 221 and a second electromagnet group 223. The electromagnet group 22 comprises a plurality of electromagnets 26. For example, the first electromagnet group 221 and the second electromagnet group 223 both comprise six electromagnets 26 that are adjacent to the inner side of the rotor 21, and periodically magnetic coupling to the permanent magnets 23. Moreover, the first electromagnets group 221 and the second electromagnets group 223 are disposed in a symmetric position with respect to the axle 27. In this embodiment, always six electromagnets 26 electromagnetically couple to the permanent magnets 23 whenever during operation. The stable and constant magnetic coupling configuration makes the embodiment running smoothly almost the same as the prior art but with structure simplified and cost reduced. The quantity of the electromagnets can be multiple of three, for example 3, 6, 9 . . . etc, if three phase electric power is designed in to drive the rotor. The quantity of the electromagnets can be multiple of two, for example 4, 6, 8 . . . etc, if two phase electric power is designed in to drive the rotor.

The stator 25 comprises at least one arm, such as at least one first arm 241 and/or at least one second arm 243, to connect the electromagnet group 221/223 to an axle 27 of the rotor 21. The first arm 241 is capable of connecting the first electromagnet group 221 to the axle 27, and the second arm 243 is capable of connecting the second electromagnet group 223 to the axle 27.

Figure 3:
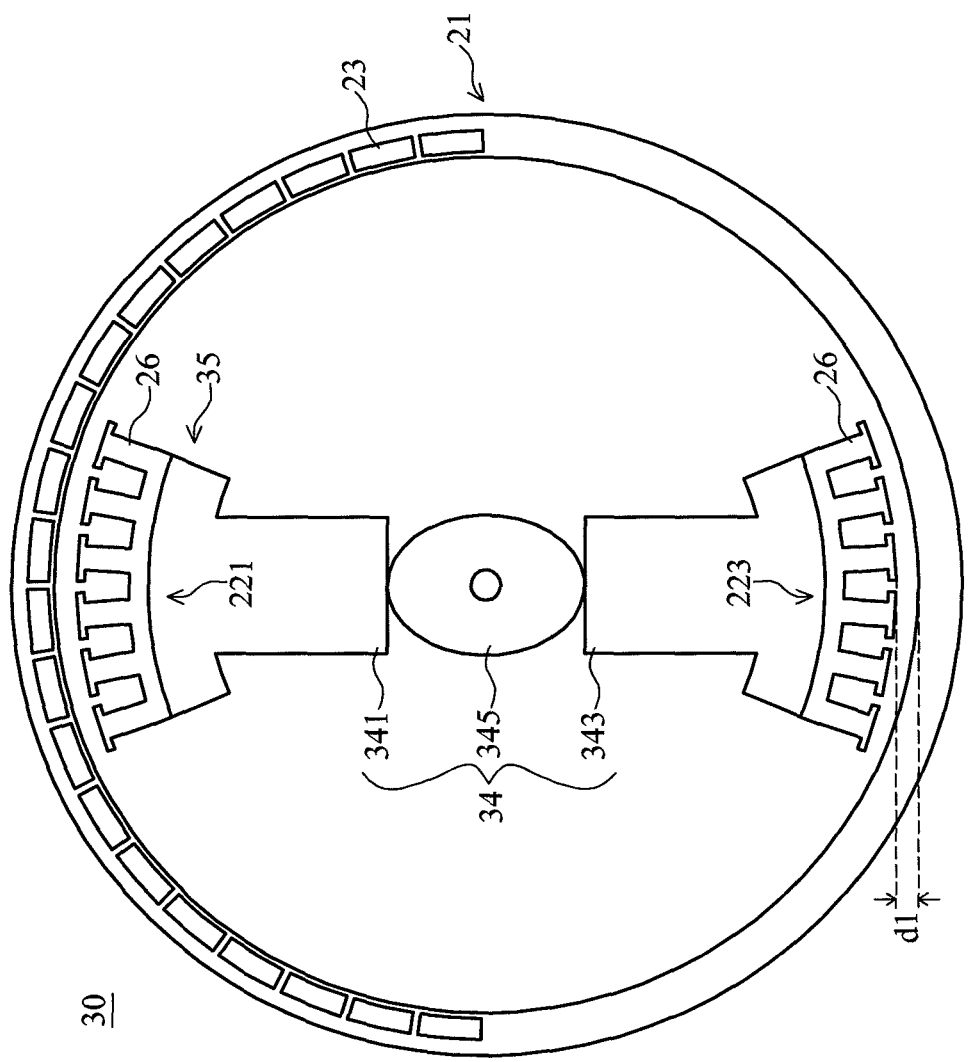
FIG. 3 and FIG. 4 are the second embodiment of a wheel driven mechanism according to the present invention.
Figure 4:
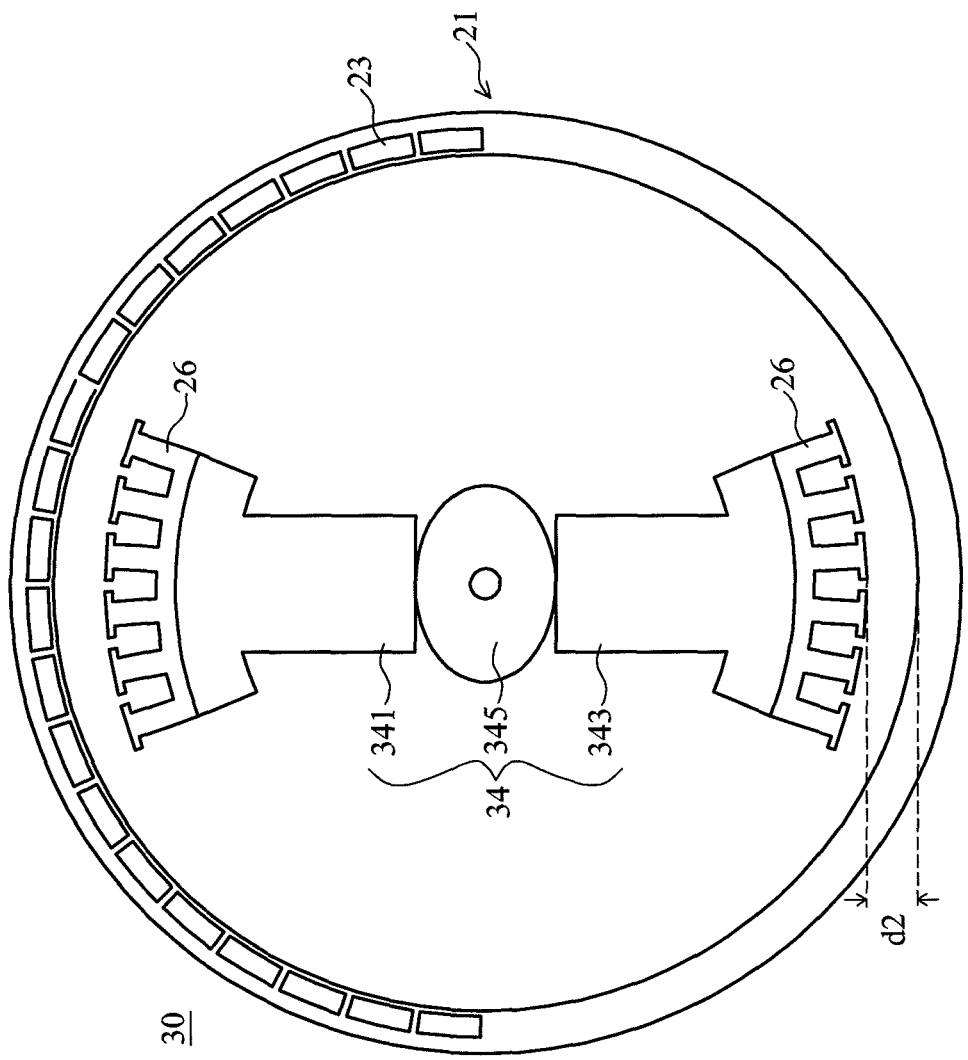

FIG. 3 and FIG. 4 are the second embodiment of a wheel driven mechanism according to the present invention.

FIG. 3 shows a wheel driven mechanism 30 comprises a rotor 21, a plurality of permanent magnets 23, a stator 35, and a plurality of electromagnets 26. The stator 35 comprises at least one retractable arm 34 that is adjustable to be an expansion status or a contraction status to adjust the space d1/d2 between the electromagnets 26 and the permanent magnets 23 on the rotor 21.

Since the electromagnets 26 are made of iron (Fe), cobalt (Co), nickel (Ni) . . . etc. ferromagnetic materials, there are still magnetic attraction forces between the permanent magnets 23 and the electromagnets 26 when the vehicle is pushed manually with power off. However, a bigger space for the separation of the electromagnets 26 away from the permanent magnets 23 is one of the choices to solve the static magnetic problem. The retractable arm 34 comprises a cam mechanism 345 and at least one arm, such as a first arm 341 and a second arm 343, connected with the cam mechanism 345, and the cam mechanism 345 is capable of adjusting the length of arms to solve this problem as shown in FIG. 3.

The first electromagnet group 221 is mounted on the outer end of the first arm 341, the second electromagnet group 223 is mounted on the outer end of the second arm 343. The cam mechanism 345 is configured between inner ends of the two arms 341/343. The cam mechanism 345 is capable of being adjusted to be at an expansion status or a contraction status. FIG. 3 shows that the cam mechanism 345 is adjusted to be at the expansion status so that a closer position with a space d1 is set in between the permanent magnets 23 and the electromagnets 26 to facilitate the vehicle to move by powered wheel driven mechanism 30 during power on. There is an operation space d1 in between the permanent magnets 23 and the electromagnets 26.

FIG. 4 shows that the cam mechanism 345 is adjusted to be at the contraction status so that a farther position with a space d2 is set in between the permanent magnets 23 and the electromagnets 26 to facilitate the vehicle to move manually during power off. A bigger space d2 is created in between the permanent magnets 23 and the electromagnets 26 so as to reduce the static attractive forces to a minimum between the permanent magnets 23 and the electromagnets 26 during power off.

In addition, the handwheel mechanism 10 of the prior art as shown in FIG. 1 also can equip with the retractable arm 34, such as the first arm 341, the second arm 343 and the cam mechanism 345, to facilitate to rotate the handwheel mechanism 10 manually during power off.

Figure 5:
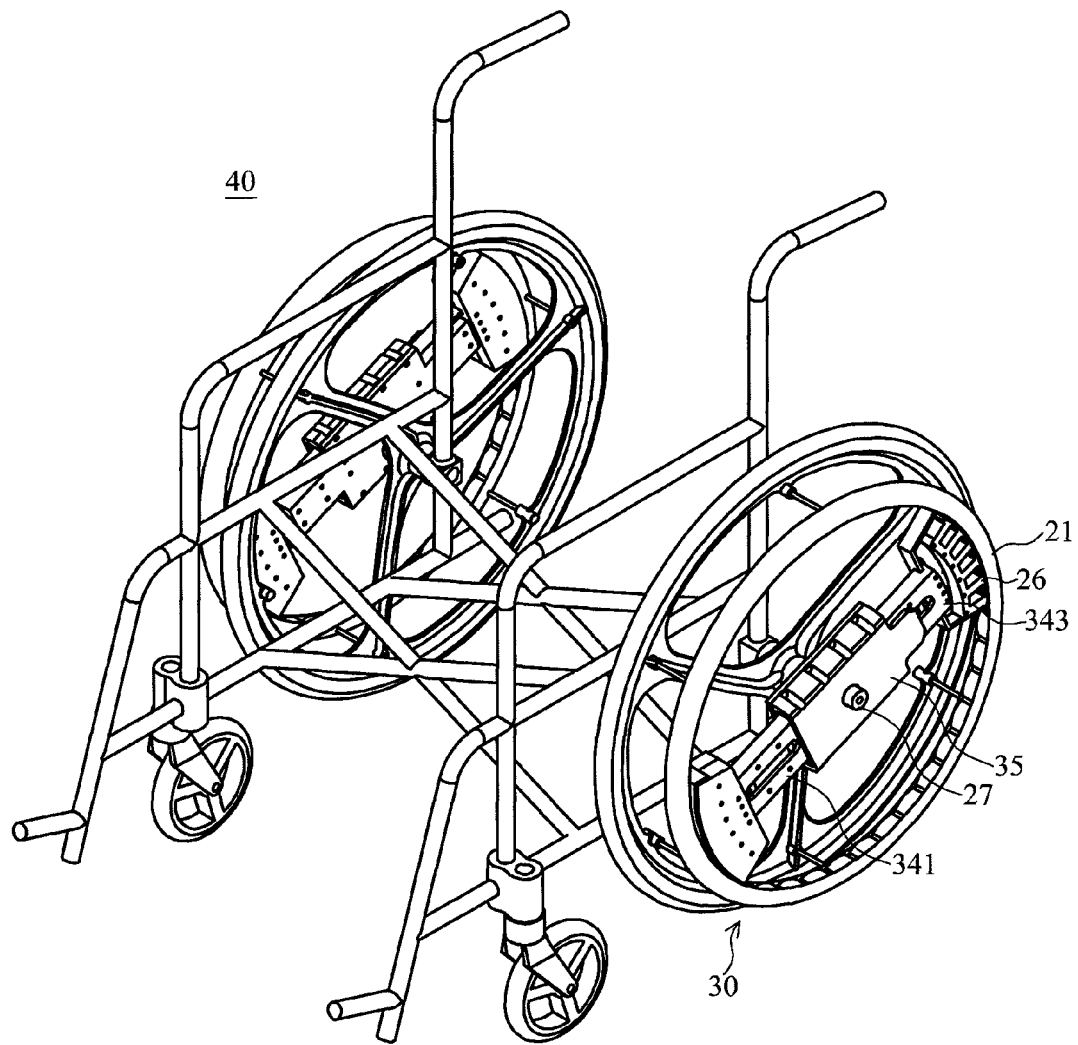
FIG. 5 shows a wheelchair equipped with the handwheel of FIG. 3.

FIG. 5 shows a wheelchair equipped with the wheel driven mechanism of FIG. 3

FIG. 5 shows that a wheelchair 40 equipped with the wheel driven mechanism 30 of FIG. 3. The wheel driven mechanism 30 is capable of driving the wheelchair 40, and the rotor 21 of the wheel driven mechanism 30 is a handwheel for the wheelchair 40. The cam mechanism 345 (FIG. 3) for adjusting the arms 341/343 mounted on the axle 27 is configured under the frame cover 35. The frame cover 35 is fixed on the axle 27 to cover the cam mechanism 345. Furthermore, a power supply, such as battery, also can be disposed within the frame cover 35 to connect and supply power to the electromagnets 26, and the wheelchair 40 can be folded easily.

Figure 6:
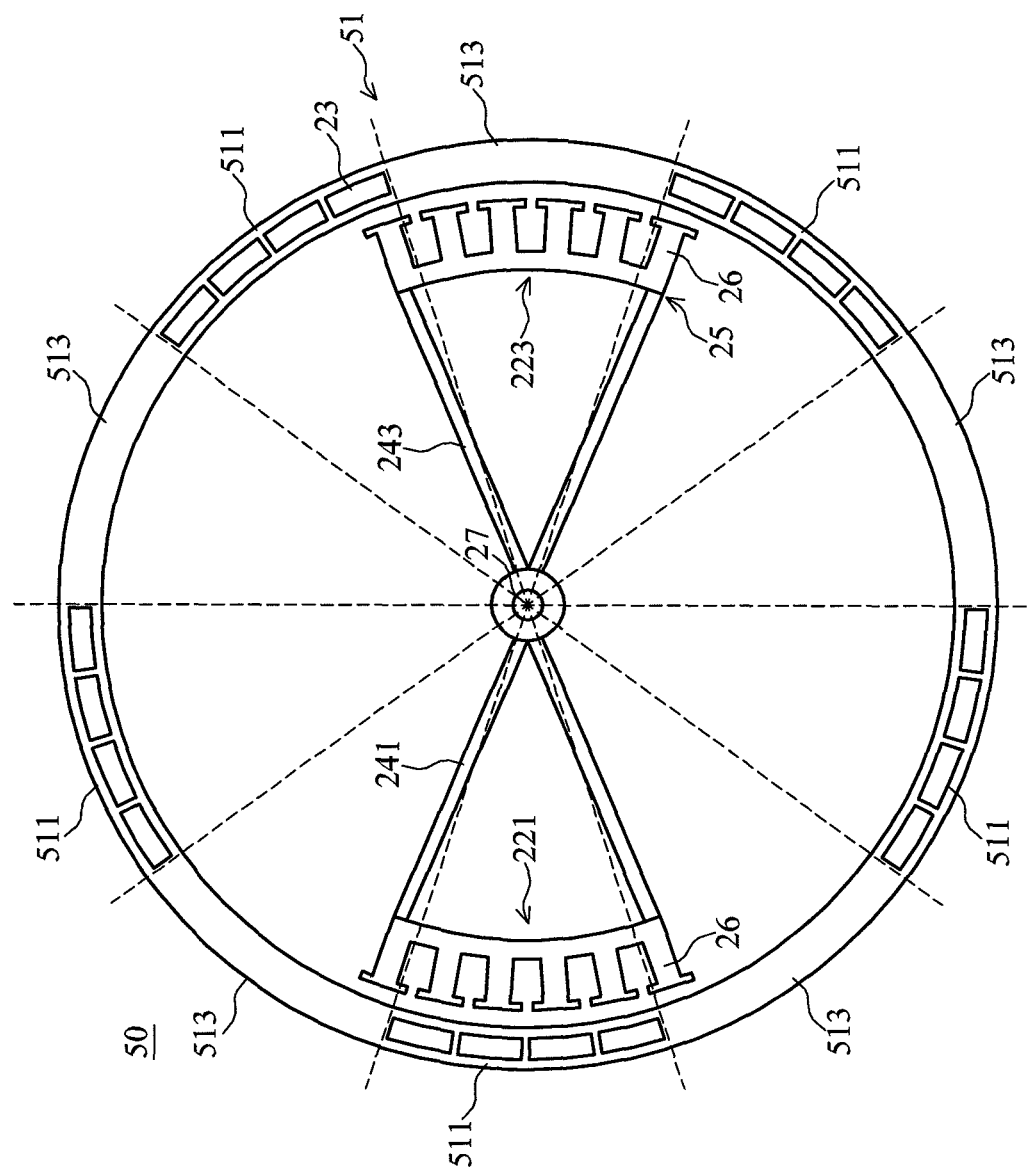
FIG. 6 shows the third embodiment of a wheel driven mechanism according to the present invention.

FIG. 6 shows the third embodiment according to the present invention.

FIG. 6 shows a wheel driven mechanism 50 comprises a rotor 51, a plurality of permanent magnets 23, a stator 25, and a plurality of electromagnets 26. The rotor 51 is divided into two part, such as five first blocks 511 and five second blocks 513. The permanent magnets 23 are disposed at the first blocks 511. There are not permanent magnets 23 disposed in the second blocks 513, so that the second blocks 513 of the rotor 51 can be empty blocks.

The rotor 51 has been divided into ten equal sections. The five groups of permanent magnets 23 are distributed evenly and occupy 5 of the ten sections of the inner surface of the rotor 51 facing the axle 27. The first electromagnet group 221 in the left side and a second electromagnet group 223 in the right side opposite to the first electromagnet group 221 are shown as an example, to be periodically magnetic coupling to the permanent magnets 23. In this embodiment, there are respectively six electromagnets 26 disposed on the first arm 241 and the second arm 243, and there are four permanent magnets 23 within one group. In addition, there are always six electromagnets 26 magnetic coupling to five permanent magnets 23. The left side six electromagnets 26 face to four permanent magnets 23 and the right side six electromagnets 26 face two halves permanent magnets 23. There is always with six electromagnets 26 facing five permanent magnets 23. In other words, there is always a magnetic coupling ratio of 6:5 between the electromagnets 26 and permanent magnets 23. The stable and constant magnetic coupling configuration makes the vehicle move smoothly.

In addition, the first group 221 and second group 223 may also be spaced with any angles (e.g. 60°) other than a symmetric position with respect to the axle 27. The stator 25 could further comprise a third electromagnet group, and any two of the three groups are spaced with 120° with respect to the axle. Moreover, the stator 25 could further comprise only one or even more than three electromagnet groups.

Figure 7:
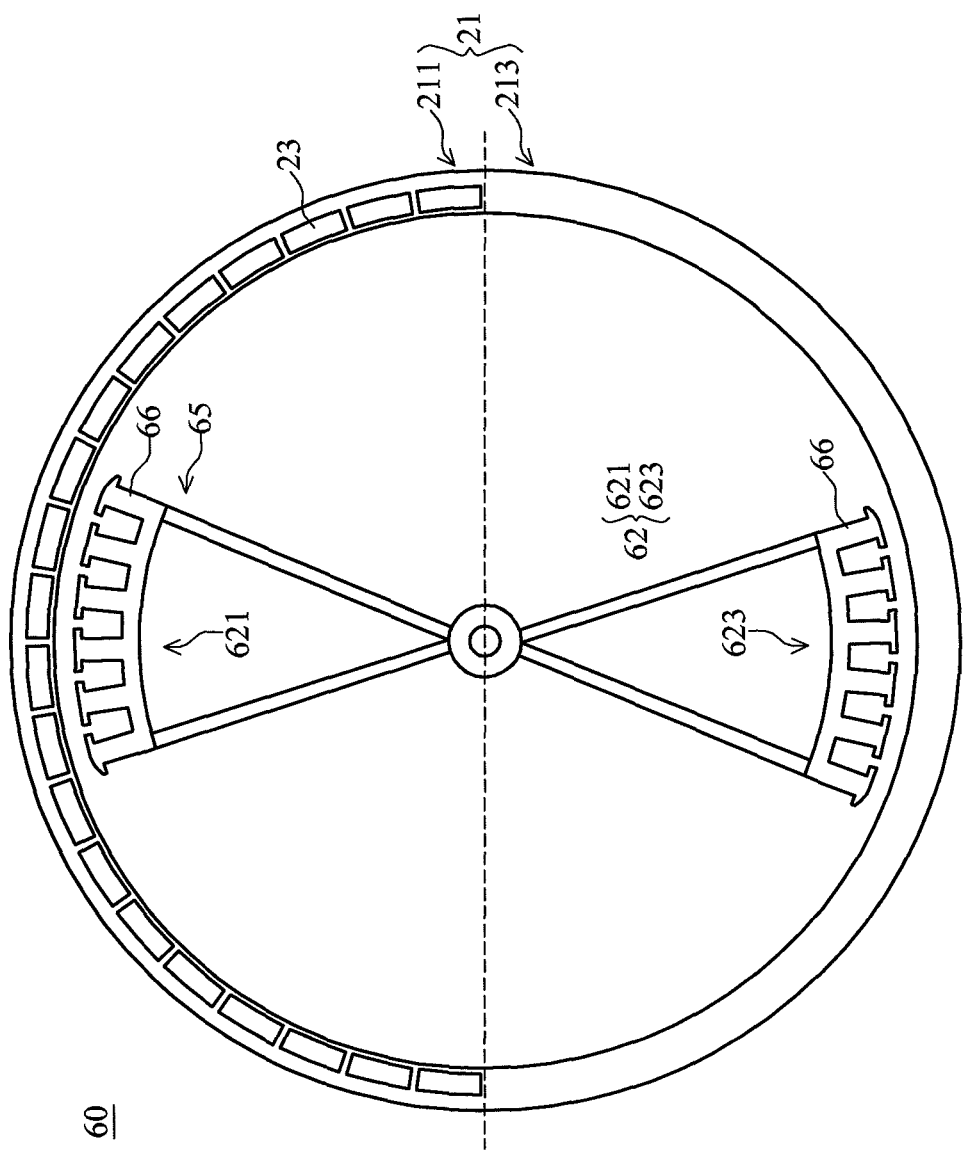
FIG. 7 shows the fourth embodiment of a wheel driven mechanism according to the present invention.
Figure 8:
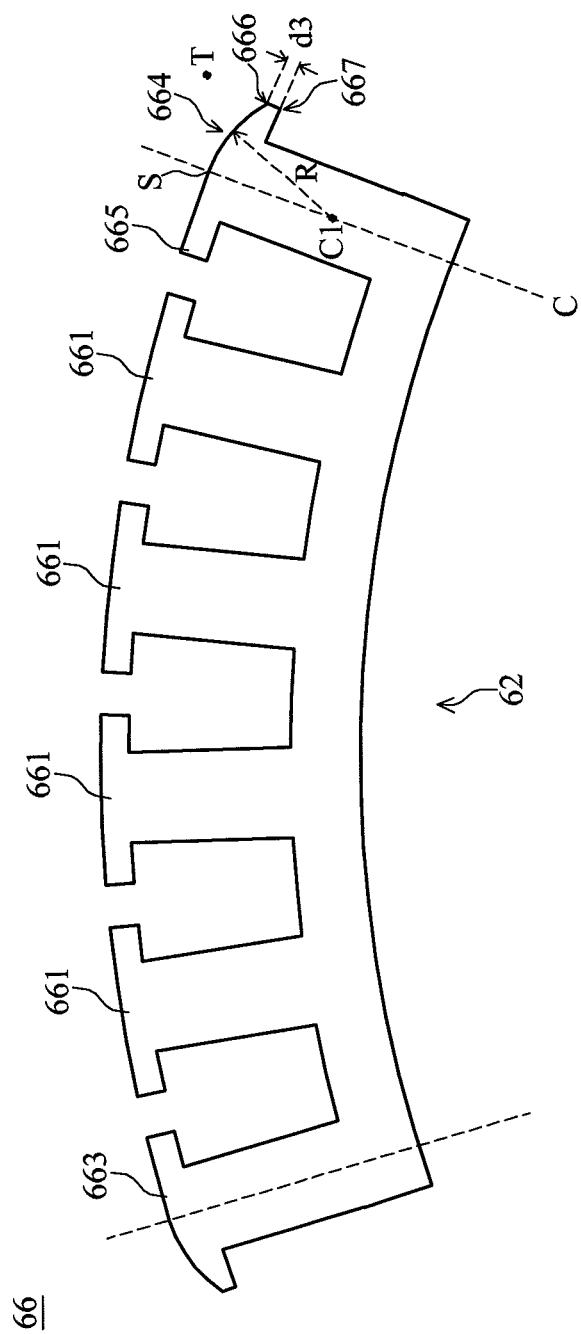
FIG. 8 shows enlarged partial schematic view of electromagnet.

FIG. 7 and FIG. 8 show the fourth embodiment of a wheel driven mechanism according to the present invention.

FIG. 7 shows a wheel driven mechanism 60 comprises a rotor 21, a plurality of permanent magnets 23, a stator 65, and a plurality of electromagnets 66. The stator 65 comprises at least one electromagnet group 62, such as a first electromagnet group 621 and a second electromagnet group 623.

FIG. 8 shows the enlarged partial schematic view of electromagnet. The electromagnet group 62 comprises a plurality of electromagnets 66, such as at least one central electromagnet 661 and two fringe electromagnets 663/664. In this embodiment, the first electromagnet group 621 and a second electromagnet group 623 both comprise four central electromagnets 661 and two fringe electromagnets 663/664. The central electromagnets 661 have curved top of the same radius of curvature and of the same center of the axle 27 in FIG. 6, and the two fringe electromagnets 663/665 have reshaped top surface to be an arc surface 664 at outer edges and which is arc away from the permanent magnets 23 to facilitate to rotate the wheel driven mechanism 60 manually during power off.

In one embodiment of the invention, The rotor 21 is divided into two part, such as a first block 211 and a second block 213. The permanent magnets 23 are disposed in the first block 211. There is not permanent magnets 23 disposed in the second block 213, so that the second block 213 of the rotor 21 can be an empty block. However, the handwheel mechanism 10 of the prior art as shown in FIG. 1 or the wheel driven mechanism 30 as shown in FIG. 3, FIG. 4 or FIG. 6 also can equip with the electromagnets 66, such as at least one central electromagnet 661 and two fringe electromagnets 663/664, to facilitate to rotate the handwheel mechanism 10 manually during power off.

Besides, the wheel driven mechanism could comprise only two fringe electromagnets disposed on said stator without the central electromagnet. Moreover, the wheel driven mechanism may also comprise only one fringe electromagnet having an arc surface at an outer edge thereof or having two arc surfaces at outer edges thereof.

The above-mentioned wheel driven mechanisms 20/30/50/60 are the driving wheel for a vehicle, such as a wheelchair, an electrical bicycle, or a motorcycle.

The following steps show, one of design choices, the determination of an arc surface 664 according to the present invention. Firstly, determining a center line C of the end electromagnet 663/665 in a section view as shown in FIG. 8. Secondly, determining a starting point S on top surface which is an intersection point of the center line C and the top surface of the end electromagnet 663/665. Thirdly, determining a desired minimum thickness d3 at outer edge between points 666 and 667. Fourthly, determining an arc center C1 on the center line C so that the distance between arc center C1 and point S equals to the distance between arc center C1 and point 666. Fifthly, using a distance between the starting point S and the arc center C1 as a radius R. Sixthly, making an arc with the radius R and end on the end point 666 at the outer edge of the electromagnet 663/665.

Figure 9:
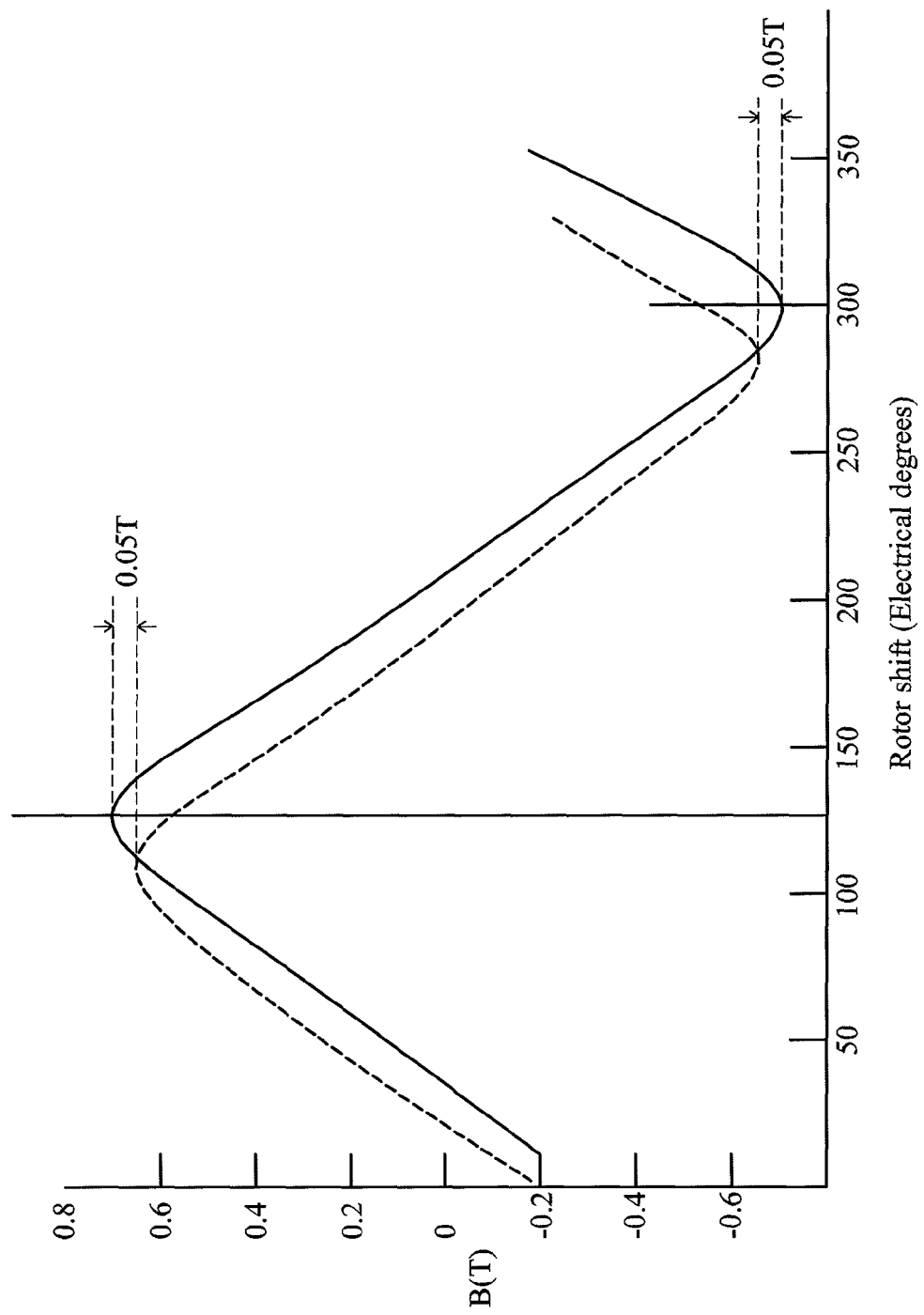
FIG. 9 shows the effect of a reshaped electromagnet FIG. 8.

FIG. 9 shows the effect of a reshaped electromagnet FIG. 8.

FIG. 9 shows a figure of magnetic flux density (B) with a unit Tesla (T) versus rotor shift at point T. Point T is defined in a position right above point 666 and right to point S. "Rotor shift" is defined by the relative electric angle of permanent magnets with respect to the electromagnets. The dashed line represents magnetic flux density at point T after shaping the electromagnet. The solid line represents magnetic flux at point T of a non-reshaped electromagnet. There is a 0.05 T difference between the two either on peak or on valley. The lesser magnetic flux density (0.05 T) for the reshaped electromagnet 66 reduces fringing effect and therefore reduces torque ripple, the smaller Tesla of the end electromagnet 663/665 does a great advantage to the smooth moving for the vehicle compared to the one with a non-reshaped electromagnet at the end of a group of electromagnet used in the wheel driven system.

While several embodiments have been described by way of example, it will be apparent to those skilled in the art that various modifications may be made without departing from the spirit of the present invention. Such modifications are all within the scope of the present invention, as defined by the appended claims.

What is claimed is:

1. A wheel driven mechanism, comprising:
   a rotor comprising at least one first block and at least one second block;
   a plurality of permanent magnets disposed in said first block of said rotor, and said second block is empty;
   a stator; and
   at least one electromagnet group disposed on said stator,
   wherein said stator comprises at least one retractable arm that is adjustable to be an expansion status or a contraction status, and
   wherein said retractable arm comprises a cam mechanism and a plurality of arms connecting with said cam mechanism, and said cam mechanism is capable of adjusting the length of said arms.

2. A wheel driven mechanism, comprising:
   a rotor;
   a plurality of permanent magnets disposed on said rotor;
   a stator comprising at least one retractable arm; and
   a plurality of electromagnets disposed on said retractable arm, wherein said retractable arm is adjustable to be an expansion status or a contraction status,
   wherein said electromagnets comprise at least one central electromagnet and two fringe electromagnets having an arc surface at outer edges thereof.

3. The wheel driven mechanism as claimed in claim 2, wherein said arc surface is arc away from said permanent magnet.

4. A wheel driven mechanism, comprising:
   a rotor;
   a plurality of permanent magnets disposed on said rotor;
   a stator comprising at least one retractable arm; and
   a plurality of electromagnets disposed on said retractable arm, wherein said retractable arm is adjustable to be an expansion status or a contraction status,
   wherein said retractable arm comprises a cam mechanism and a plurality of arms connecting with said cam mechanism, and said cam mechanism is capable of adjusting the length of said arms.

5. The wheel driven mechanism as claimed in either claim 2 or claim 4, wherein said electromagnets magnetically couple to said permanent magnets periodically.

* * * * *